(12) United States Patent
Ishikawa (10) Patent No.: US 11,942,827 B2
(45) Date of Patent: Mar. 26, 2024

(54) ROTOR, MOTOR, COMPRESSOR, AND REFRIGERATION AND AIR-CONDITIONING DEVICE

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 428 days.

(21) Appl. No.: 17/277,039

(22) PCT Filed: Oct. 30, 2018

(86) PCT No.: PCT/JP2018/040229
§ 371 (c)(1),
(2) Date: Mar. 17, 2021

(87) PCT Pub. No.: WO2020/089991
PCT Pub. Date: May 7, 2020

(65) Prior Publication Data
US 2021/0273507 A1    Sep. 2, 2021

(51) Int. Cl.
*H02K 21/14* (2006.01)
*F25B 31/02* (2006.01)
*H02K 1/276* (2022.01)

(52) U.S. Cl.
CPC ......... *H02K 1/2766* (2013.01); *F25B 31/026* (2013.01); *H02K 21/14* (2013.01); *H02K 2213/03* (2013.01)

(58) Field of Classification Search
CPC ........ H02K 1/272; H02K 1/274; H02K 1/276; H02K 1/278; H02K 1/246; H02K 1/2766;
(Continued)

(56) References Cited

U.S. PATENT DOCUMENTS

| 2005/0042114 A1* | 2/2005 | Seo ..................... F04B 39/0055 |
| | | 417/540 |
| 2006/0113858 A1 | 6/2006 | Hino et al. |

(Continued)

FOREIGN PATENT DOCUMENTS

| CN | 102957239 A | 3/2013 |
| CN | 108352741 A | 7/2018 |

(Continued)

OTHER PUBLICATIONS

Office Action dated Jan. 30, 2023 in connection with counterpart Korean Patent Application No. 10-2021-7008626 (and English machine translation).

(Continued)

*Primary Examiner* — Bryan R Perez
(74) *Attorney, Agent, or Firm* — POSZ LAW GROUP, PLC (57) ABSTRACT

A rotor includes an electromagnetic steel sheet, a first permanent magnet, and a second permanent magnet. The electromagnetic steel sheet includes a first magnet insertion hole and a second magnet insertion hole that are arranged in a V shape, and also includes a center rib between the first magnet insertion hole and the second magnet insertion hole. The rotor satisfies $T \leq W1 \leq 2 \times T \leq W2$, where T is a thickness of the electromagnetic steel sheet, W1 is a minimum width of the center rib, and W2 is a maximum width of the center rib.

10 Claims, 8 Drawing Sheets

(58) Field of Classification Search
CPC .......... H02K 1/2786; H02K 1/24; H02K 1/26; H02K 1/22; H02K 1/28; H02K 1/27; H02K 1/223; H02K 1/2773
See application file for complete search history.

(56) References Cited

U.S. PATENT DOCUMENTS

| 2007/0063607 | A1* | 3/2007 | Hattori ................. H02K 1/2766 |
| | | | 310/156.53 |
| 2011/0081263 | A1* | 4/2011 | Yoshino ................... H02K 1/28 |
| | | | 310/212 |
| 2011/0285241 | A1 | 11/2011 | Chamberlin et al. |
| 2012/0181888 | A1 | 7/2012 | Shibukawa et al. |
| 2013/0043757 | A1 | 2/2013 | Kagami et al. |
| 2014/0217849 | A1 | 8/2014 | Soma et al. |
| 2017/0338707 | A1 | 11/2017 | Shono et al. |
| 2018/0248428 | A1 | 8/2018 | Nigo et al. |

FOREIGN PATENT DOCUMENTS

| JP | 2005-287285 A | 10/2005 |
| JP | 2010-075011 A | 4/2010 |
| JP | 2013-042596 A | 2/2013 |
| JP | 2013-046421 A | 3/2013 |
| JP | 2015-002649 A | 1/2015 |
| JP | 2017-192211 A | 10/2017 |
| WO | 2013/069076 A1 | 5/2013 |
| WO | 2016/104418 A1 | 6/2016 |
| WO | 2017/077580 A1 | 5/2017 |

OTHER PUBLICATIONS

Office Action dated Feb. 7, 2022 in connection with counterpart Indian Patent Application No. 202127017094.
An extended European Search Report dated Oct. 8, 2021 in connection with counterpart European Patent Application No. 18938352.4.
Office Action dated Jun. 30, 2023 in connection with counterpart Korean Patent Application No. 10-2021-7008626 (and English machine translation).
International Search Report dated Feb. 5, 2019, in corresponding International Application PCT/JP2018/040229, dated Oct. 30, 2018; 4 pp.
Office Action dated Aug. 15, 2023 in connection with counterpart Chinese Patent Application No. 201880097949.4 (and English machine translation).
Office Action dated Oct. 13, 2023 issued in corresponding KR patent application No. 10-2021-7008626 (and English translation).
Office Action dated Jan. 23, 2024 in counterpart European Patent Application No. 18938352.4.

* cited by examiner

ROTOR, MOTOR, COMPRESSOR, AND REFRIGERATION AND AIR-CONDITIONING DEVICE

CROSS REFERENCE TO RELATED APPLICATION

This application is a U.S. National Stage Application of International Application No. PCT/JP2018/040229, filed Oct. 30, 2018, the contents of which are incorporated herein by reference.

TECHNICAL FIELD

The present invention relates to a rotor for use in a motor.

BACKGROUND

Rotors having magnet insertion holes provided with flux barriers, which are spaces, have been used. In such a rotor, leakage flux can be reduced, and thus motor efficiency can be enhanced. However, because of the presence of a thin-wall portion between the outer peripheral surface of the rotor and the flux barrier, stress tends to be concentrated on the thin-wall portion during rotation of the rotor. As the rotation speed of the rotor increases, this stress increases, and as a result, the rotor, especially the thin-wall portion, is easily deformed. In view of this, a rotor having a center rib (also simply referred to as a "rib") between two magnet insertion holes is proposed (see, for example, Patent Reference 1). In the rotor having the center rib, a part of stress occurring in the rotor is dispersed to the center rib, and thus stress generated in the thin-wall portion is reduced. This can prevent deformation of the rotor.

PATENT REFERENCE

Patent Reference 1: Japanese Patent Application Publication No. 2017-192211

In the case where the center rib is present between two magnet insertion holes, however, the strength of the rotor to a centrifugal force increases, but magnetic flux passing through the center rib, that is, leakage flux, increases, and motor efficiency decreases, disadvantageously.

It is therefore an object of the present invention to increase strength of a rotor to a centrifugal force while reducing leakage flux in the rotor.

A rotor according to an aspect of the present invention includes: an electromagnetic steel sheet including a first magnet insertion hole, a second magnet insertion hole, and a center rib between the first magnet insertion hole and the second magnet insertion hole; a first permanent magnet disposed in the first magnet insertion hole; and a second permanent magnet disposed in the second magnet insertion hole. The first magnet insertion hole and the second magnet insertion hole are arranged in a V shape in a plane orthogonal to an axial direction. The rotor satisfies $T \leq W1 \leq 2 \times T \leq W2$, $W1 < W2$, and $0.9 \leq W1/T \leq 1.9$, where T is a thickness of the electromagnetic steel sheet, W1 is a minimum width of the center rib in a direction orthogonal to a radial direction, and W2, is a maximum width of the center rib in the direction orthogonal to the radial direction.

SUMMARY

The present invention can increase strength of the rotor to a centrifugal force while reducing leakage flux in the rotor.

DETAILED DESCRIPTION

First Embodiment

In xyz orthogonal coordinate systems illustrated in the drawings, a z-axis direction (z axis) represents a direction parallel to an axis line Ax of a rotor 2, an x-axis direction (x axis) represents a direction orthogonal to the z-axis direction (z axis), and a y-axis direction (y axis) is a direction orthogonal to both the z-axis direction and the x-axis direction. The axis line Ax is a rotation center of the rotor 2. The axis line Ax also represents an axis line of a motor 1 described later. A direction parallel to the axis line Ax will be referred to as an "axial direction of the rotor 2" or simply as an "axial direction." The "radial direction" refers to a radial direction of the rotor 2 or a stator 3, and is a direction orthogonal to the axis line Ax. An xy plane is a plane orthogonal to the axial direction. Arrow D1 represents a circumferential direction about the axis line Ax.

Figure 1:
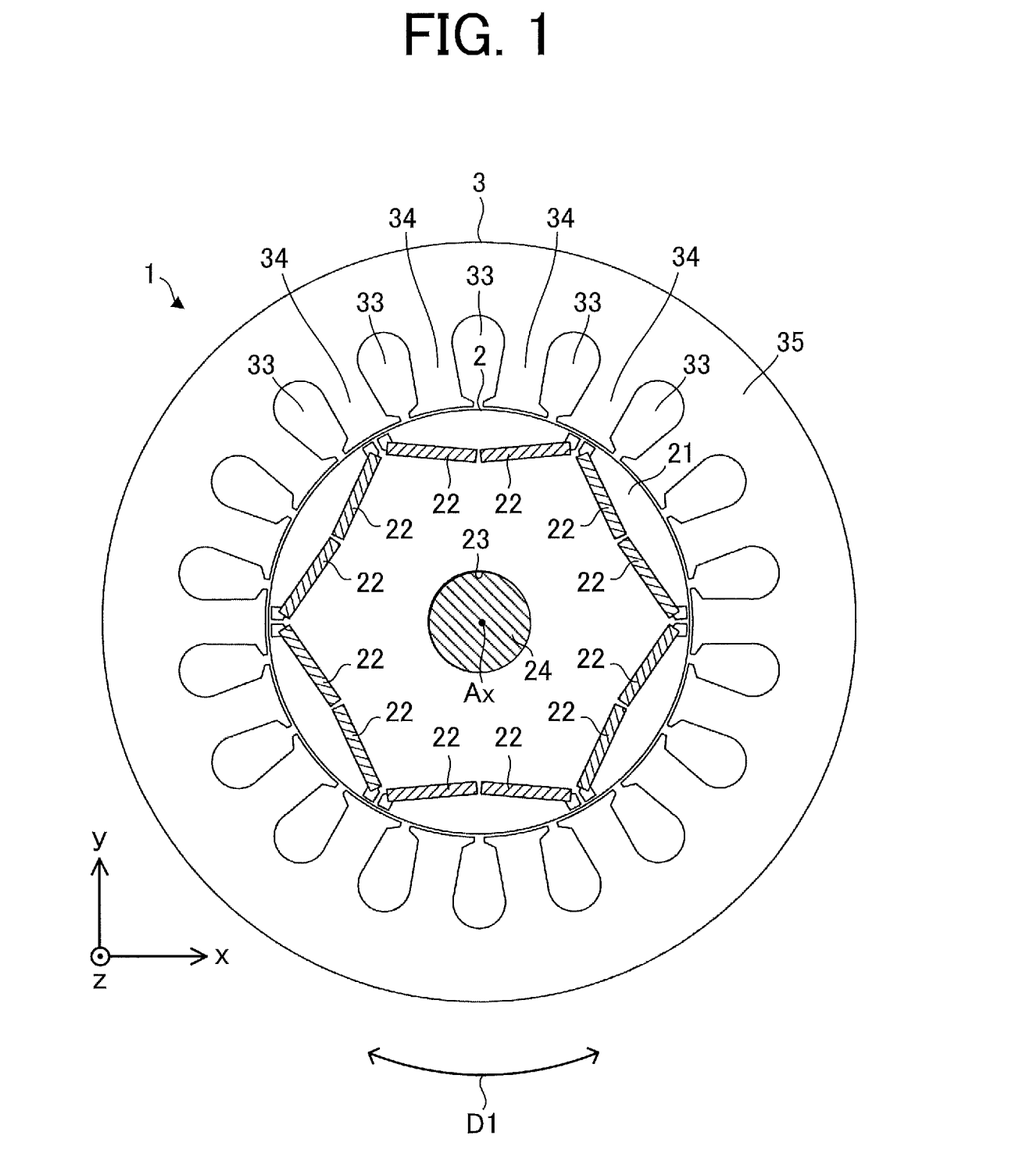
FIG. 1 is a cross-sectional view schematically illustrating a structure of a motor according to a first embodiment of the present invention.

FIG. 1 is a cross-sectional view schematically illustrating a structure of the motor 1 according to a first embodiment of the present invention.

The motor 1 includes the rotor 2 and the stator 3.

In this embodiment, the motor 1 is, for example, a three-phase synchronous motor. Specifically, the motor 1 is a permanent magnet synchronous motor (also called a brushless DC motor) such as an interior permanent magnet motor.

The rotor 2 is rotatably disposed inside the stator 3. An air gap is formed between the rotor 2 and the stator 3. The rotor 2 rotates about the axis line Ax. The rotor 2 includes a rotor core 21, at least one permanent magnet 22, and a shaft 24.

The stator 3 is disposed outside the rotor 2. The stator 3 includes, for example, an annular stator core, and a stator winding wound around the stator core. In the example illustrated in FIG. 1, the stator 3 includes a yoke 35 extending in the circumferential direction of the stator 3, and a plurality of teeth 34 extending in the radial directions from the yoke 35. Spaces between the teeth 34 serve as slots 33 in each of which the stator winding is disposed.

The stator winding used for the stator 3 is, for example, a winding in which an insulation film is formed around a conductor such as copper or aluminum.

The stator core of the stator 3 is constituted by, for example, annular electromagnetic steel sheets stacked in the axial direction. Each of the electromagnetic steel sheets is punched in a predetermined shape beforehand. Each electromagnetic steel sheet has a thickness of, for example, 0.25 mm to 0.5 mm. The electromagnetic steel sheets are fixed together by swaging.

Figure 2:
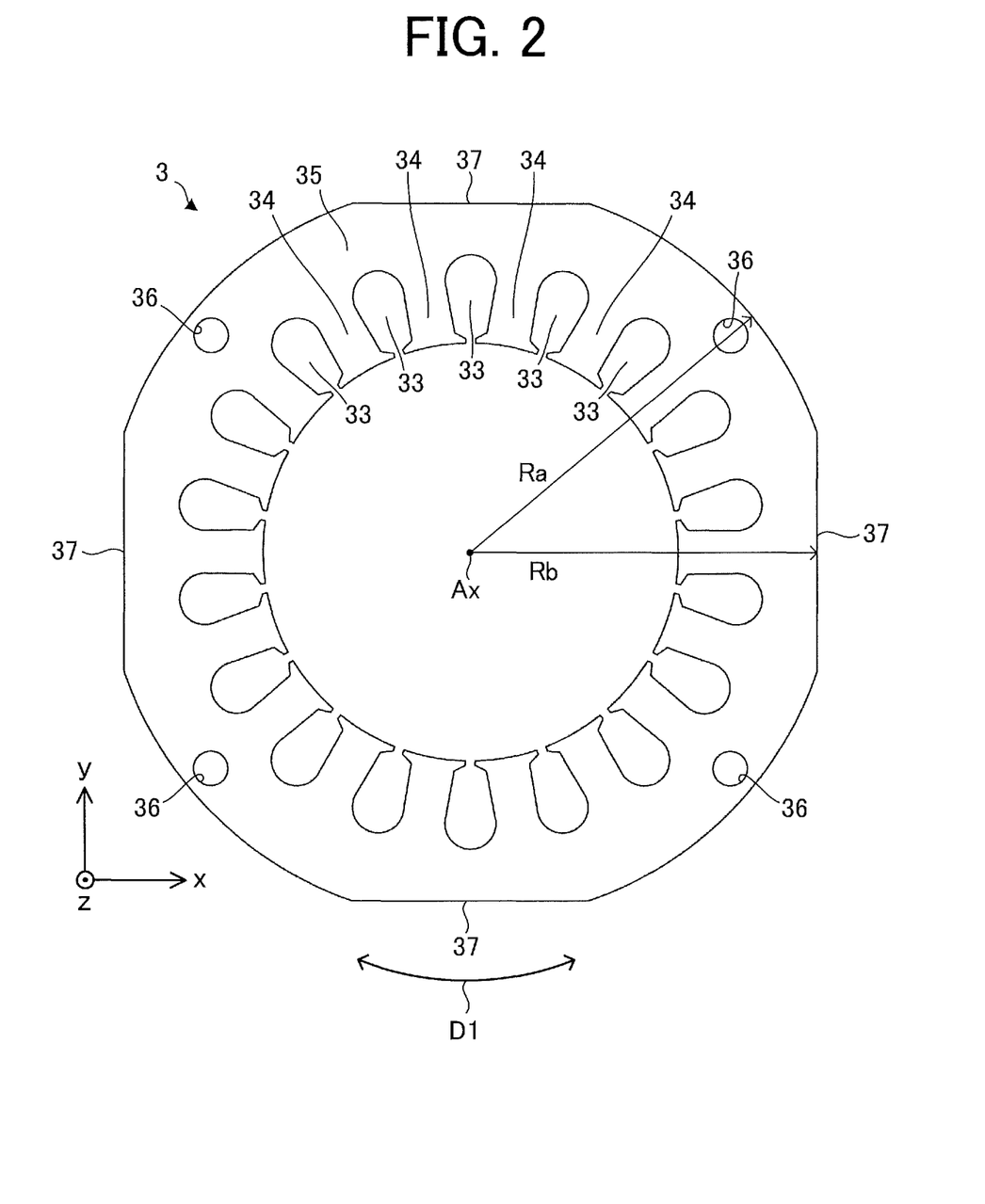
FIG. 2 is a diagram illustrating another example of a stator.

FIG. 2 is a diagram illustrating another example of the stator 3.

The stator 3 illustrated in FIG. 2 includes, in addition to the yoke 35 and the plurality of teeth 34, at least one hole 36 extending in the axial direction and at least one notch 37 formed in the outer peripheral surface of the stator 3. Instead of the stator 3 illustrated in FIG. 1, the stator 3 illustrated in FIG. 2 may be used for the motor 1.

In the example illustrated in FIG. 2, a plurality of holes 36 are formed in the yoke 35. Each of the holes 36 extends in the axial direction. In a case where the motor 1 is used as a driving source of a compressor, for example, each hole 36 is used as a channel through which a refrigerant flows in the compressor. Accordingly, the motor 1 can be effectively cooled in the compressor.

In the example illustrated in FIG. 2, a plurality of notches 37 are formed on the outer peripheral surface of the stator 3. Accordingly, in the xy plane, the stator 3 has a maximum radius Ra and a radius Rb smaller than the maximum radius Ra. The radius Rb is a minimum radius from the axis line Ax to the notches 37. In the case where the motor 1 is used as a driving source of the compressor, for example, a space is formed between a housing of the compressor and the notches 37, and this space is used as a channel through which a refrigerant passes. Accordingly, the motor 1 can be effectively cooled in the compressor.

The structure of the rotor 2 will be described specifically.

In the example illustrated in FIG. 1, the rotor 2 includes a rotor core 21, a plurality of permanent magnets 22 embedded in the rotor core 21, and a shaft 24 fitted in a center portion 23 of the rotor core 21. The rotor 2 includes two or more magnetic poles. Two or more permanent magnets 22 constitute one magnetic pole of the rotor 2.

Figure 3:
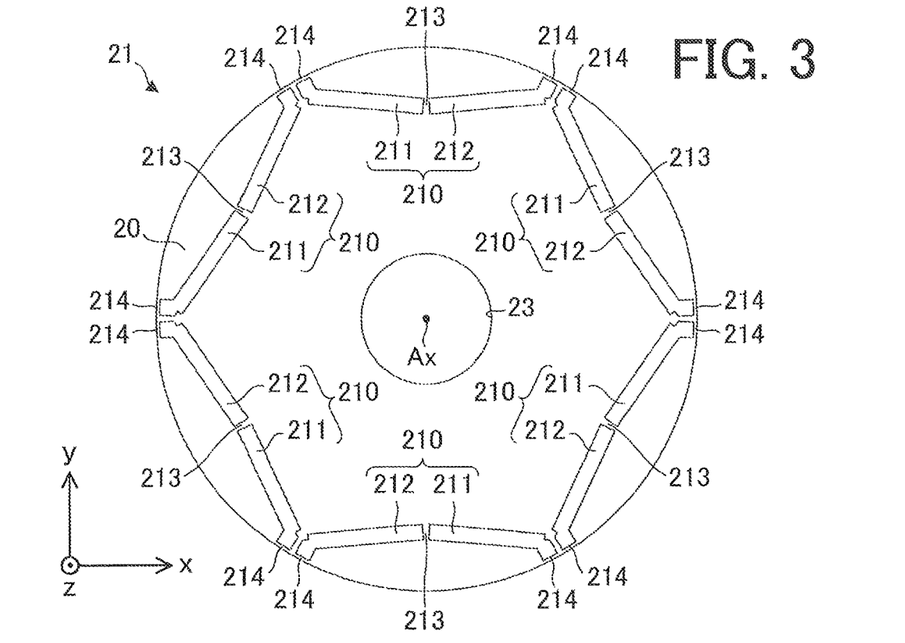
FIG. 3 is a plan view schematically illustrating a structure of a rotor core.

FIG. 3 is a plan view schematically illustrating a structure of the rotor core 21.

Figure 4:
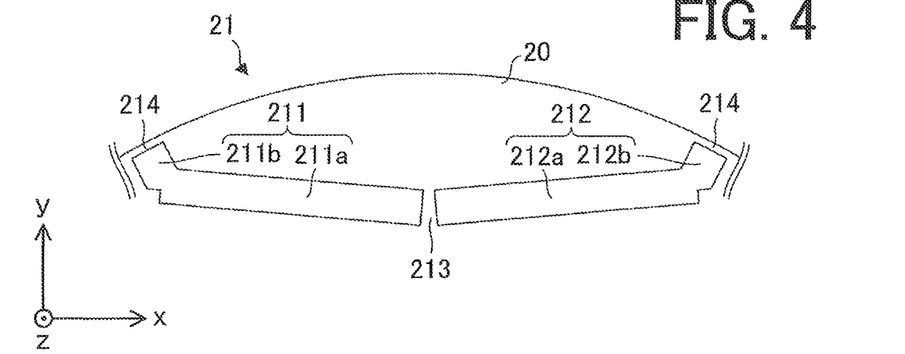
FIG. 4 is an enlarged view illustrating a region constituting one magnetic pole of a rotor.

FIG. 4 is an enlarged view illustrating a region constituting one magnetic pole of the rotor 2.

The rotor core 21 is an annular rotor core. The rotor core 21 includes at least one electromagnetic steel sheet 20. In this embodiment, a plurality of electromagnetic steel sheets 20 are stacked in the axial direction. Each of the electromagnetic steel sheets 20 includes two or more pairs of magnet insertion holes 210, at least one center rib 213, at least one thin-wall portion 214, and the center portion 23 (also referred to as a magnet insertion hole).

Each pair of the magnet insertion holes 210 includes a first magnet insertion hole 211 and a second magnet insertion hole 212. In the xy plane, the center of one pair of magnet insertion holes 210 projects toward the center (i.e., the axis line Ax) of the rotor core 21. That is, one pair of magnet insertion holes 210 (i.e., the first magnet insertion hole 211 and the second magnet insertion hole 212) is arranged in a V shape in the xy plane. The center rib 213 is formed between the first magnet insertion hole 211 and the second magnet insertion hole 212.

The first magnet insertion hole 211 includes a magnet placement portion 211a (also referred to as a first magnet placement portion) where the permanent magnet 22 serving as a first permanent magnet is placed and a flux barrier 211b (also referred to as a first flux barrier) that is a space between the permanent magnet 22 and the thin-wall portion 214.

The second magnet insertion hole 212 includes a magnet placement portion 212a (also referred to as a second magnet placement portion) where the permanent magnet 22 serving as a second permanent magnet is placed and a flux barrier 212b (also referred to as a second flux barrier) that is a space between the permanent magnet 22 and the thin-wall portion 214.

The thin-wall portion 214 between the outer peripheral surface of the electromagnetic steel sheet 20 and the first magnet insertion hole 211 will be also referred to as a "first thin-wall portion." The thin-wall portion 214 between the outer peripheral surface of the electromagnetic steel sheet 20 and the second magnet insertion hole 212 will be also referred to as a "second thin-wall portion."

In the example illustrated in FIG. 3, each electromagnetic steel sheet 20 includes the center portion 23, six magnet insertion holes 210, six center ribs 213, and twelve thin-wall portions 214. The six magnet insertion holes 210 are arranged in the circumferential direction of the rotor 2. Each first magnet insertion hole 211 and each second magnet insertion hole 212 extend in the axial direction. The center portion 23 is a hole extending in the axial direction.

The permanent magnet 22 as the first permanent magnet is placed in each first magnet insertion hole 211. The permanent magnet 22 as the second permanent magnet is placed in each second magnet insertion hole 212.

Each permanent magnet 22 is, for example, a plate permanent magnet. Each permanent magnet 22 is, for example, a rare earth magnet containing neodymium (Nd) and dysprosium (Dy). The rare earth magnet has a high residual flux density and a high coercive force. Thus, in the case of using rare earth magnets as the permanent magnets 22, the motor 1 having enhanced efficiency and enhanced demagnetization resistance can be obtained. As the permanent magnets 22, magnets except for rare earth magnets, such as ferrite sintered magnets, may be used.

One pair of magnet insertion holes 210 is associated with one magnetic pole of the rotor 2. Specifically, two permanent magnets 22 (i.e., the first permanent magnet and the second permanent magnet) placed in one pair of magnet insertion holes 210 constitute one magnetic pole of the rotor 2. Thus, in this embodiment, the rotor 2 has six magnetic poles.

In general, since a centrifugal force is exerted on a rotor core during rotation of the rotor, if no center rib is formed on the rotor core, large stress is applied to thin-wall portions between the outer peripheral surface of the rotor core and magnet insertion holes (specifically flux barriers). If this stress is large, the rotor core (especially the thin-wall portions) is easily deformed. On the other hand, in this embodiment, since the center ribs 213 are formed in the rotor core 21, part of the stress generated in the rotor 2 is dispersed to the center ribs 213, and thus stress applied to the thin-wall portions 214 is reduced. Accordingly, deformation of the rotor core 21, especially the thin-wall portions 214, can be prevented.

Figure 5:
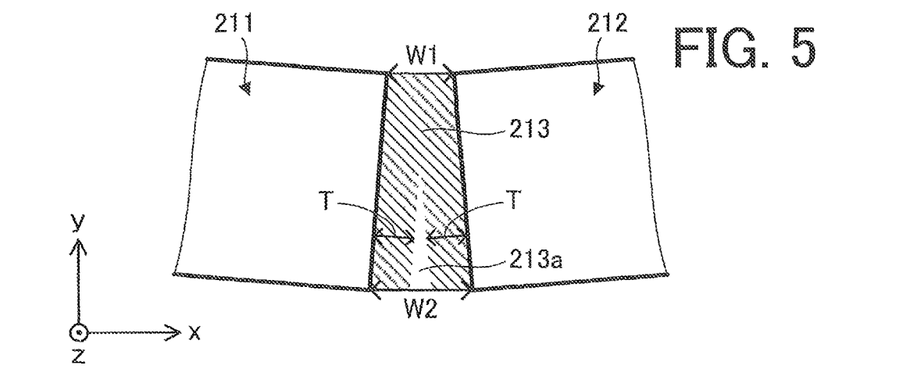
FIG. 5 is an enlarged view schematically illustrating a structure of a center rib.

FIG. 5 is an enlarged view schematically illustrating a structure of the center rib 213.

In general, degradation of magnetic properties (i.e., decrease in relative permeability) occurs in the range of a thickness T of one electromagnetic steel sheet from the surface of the electromagnetic steel sheet formed by punching. In the example illustrated in FIG. 5, degradation of magnetic properties occurs in a hatched portion of the center rib 213. Accordingly, magnetic flux from the permanent magnets 22 does not easily pass through portions where degradation of magnetic properties occurs. That is, leakage flux in the center rib 213 can be reduced.

On the other hand, strength decreases in portions where degradation of magnetic properties occurs. In view of this, the rotor 2 preferably satisfies 2× T≤W2, where W2 is a maximum width of the center rib 213 in a direction orthogonal to the radial direction of the rotor 2. Accordingly, strength does not decrease in a region 213a of the center rib 213. As a result, strength of the rotor 2 (especially the rotor core 21) can be increased. In the example illustrated in FIG. 5, the direction orthogonal to the radial direction of the rotor 2 is the x-axis direction. In FIG. 5, the region 213a is an unhatched region. A width T in FIG. 5 corresponds to the thickness T of each electromagnetic steel sheet. In this embodiment, the maximum width W2 is a width of an inner end portion of the center rib 213 in the radial direction.

The rotor 2 preferably satisfies T≤W1 where W1 is a minimum width of the center rib 213 in the direction orthogonal to the radial direction of the rotor 2. Accordingly, the first magnet insertion hole 211, the second magnet insertion hole 212, and the center rib 213 can be easily formed by punching. In this embodiment, the minimum width W1 is a width of an outer end portion of the center rib 213 in the radial direction.

In addition, the rotor 2 preferably satisfies W1≤2×T. Accordingly, in the case of forming the center rib 213 by punching, magnetic properties in part of the region of the center rib 213 can be degraded. In the example illustrated in FIG. 5, magnetic properties can be degraded in an upper region of the center rib 213, that is, a hatched region. Consequently, leakage flux in the center ribs 213 can be reduced.

Thus, the minimum width W1 of the center rib 213 preferably satisfies T≤W1≤2×T. Accordingly, the advantages described above can be obtained.

Figure 6:
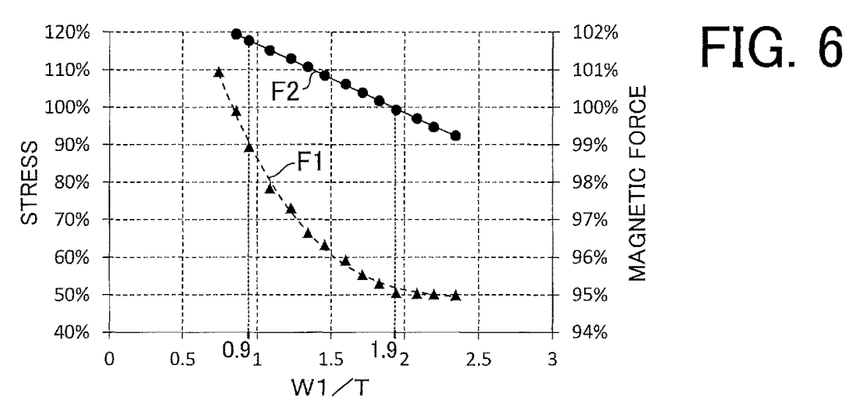
FIG. 6 is a graph showing a relationship between stress generated in the rotor core and a minimum width of the center rib.

FIG. 6 is a graph showing a relationship between stress generated in the rotor core 21 and the minimum width W1 of the center rib 213. In FIG. 6, the first vertical axis represents a maximum stress generated in the rotor core 21 (specifically a ratio with respect to a comparative example), and the second vertical axis represents a maximum magnetic force of the rotor 2 (specifically a ratio with respect to the comparative example), and the horizontal axis represents W1/T.

In FIG. 6, the broken line F1 represents a maximum stress generated in the rotor core 21 with respect to a change in the minimum width W1 in a case where a maximum stress generated in a rotor core 21a of a rotor 2a according to a comparative example is 100%. In FIG. 6, the solid line F2 represents a maximum magnetic force of the rotor 2 with respect to a change in the minimum width W1 in a case where the magnetic force of the rotor 2a of the comparative example is 100%.

Figure 7:
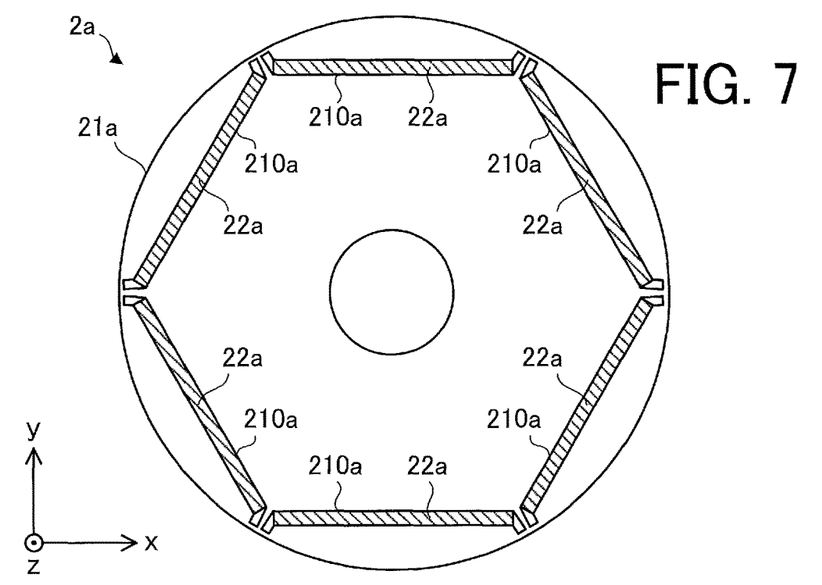
FIG. 7 is a cross-sectional view schematically illustrating a structure of a rotor according to a comparative example.

FIG. 7 is a cross-sectional view schematically illustrating a structure of the rotor 2a of the comparative example. In the rotor 2a of the comparative example, no center rib 213 is formed on the rotor core 21a. In addition, in the rotor 2a of the comparative example, one magnet insertion hole 210a is associated with one magnetic pole, and one plate permanent magnet 22a is placed in each magnet insertion hole 210a.

In this embodiment, as illustrated in FIG. 6, a ratio W1/T of the minimum width W1 with respect to the thickness T of the electromagnetic steel sheet 20 preferably satisfies 0.9≤W1/T≤1.9. Accordingly, stress applied to the rotor core 21, especially the center rib 213 and the thin-wall portion 214, can be reduced. In addition, since leakage flux in the center rib 213 can be reduced, a magnetic force of the rotor 2 can be enhanced. In this embodiment, the rotor 2 satisfies W1<W2 and 0.9≤W1/T≤1.9, and thus, the advantages described above can be obtained.

In particular, since the rotor 2 satisfies W1<W2 and 0.9≤W1/T≤1.5, stress applied to the rotor core 21, especially the center rib 213 and the thin-wall portion 214 can be reduced, and a magnetic force of the rotor 2 can be increased.

Figure 8:
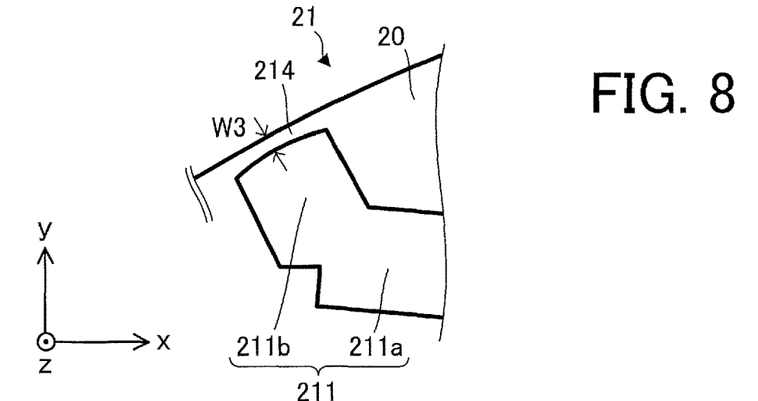
FIG. 8 is an enlarged view illustrating a structure of a thin-wall portion between the outer peripheral surface of an electromagnetic steel sheet and a first magnet insertion hole.

FIG. 8 is an enlarged view illustrating a structure of the thin-wall portion 214 between the outer peripheral surface of the electromagnetic steel sheet 20 and the first magnet insertion hole 211.

Figure 9:
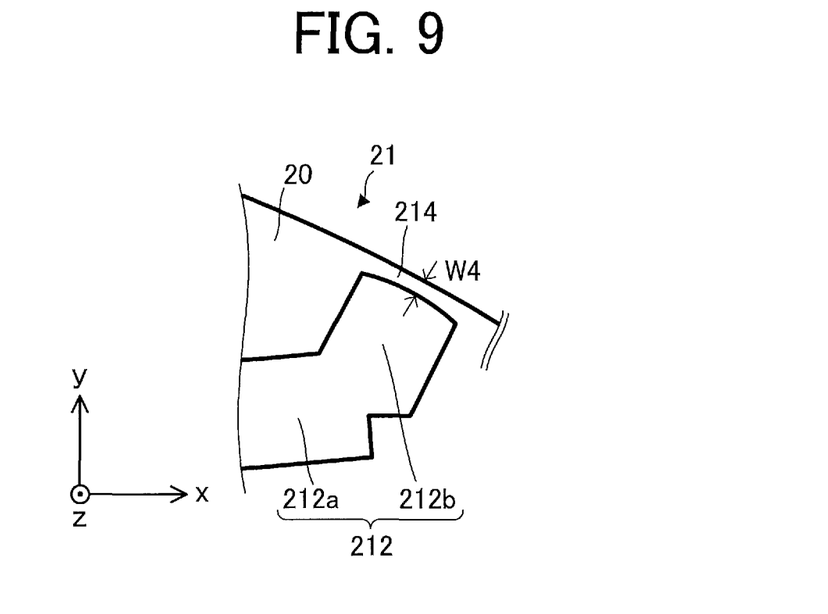
FIG. 9 is an enlarged view illustrating a structure of a thin-wall portion between the outer peripheral surface of the electromagnetic steel sheet and a second magnet insertion hole.

FIG. 9 is an enlarged view illustrating a structure of the thin-wall portion 214 between the outer peripheral surface of the electromagnetic steel sheet 20 and the second magnet insertion hole 212.

As illustrated in FIG. 8, in the xy plane, a minimum width in the radial direction (also referred to as a first radial direction) of the thin-wall portion 214 as the first thin-wall portion is represented as W3.

As illustrated in FIG. 9, in the xy plane, a minimum width in the radial direction (also referred to as a second radial direction) of the thin-wall portion 214 as the second thin-wall portion is represented as W4. In this embodiment, the minimum width W3 is equal to the minimum width W4. In this embodiment, the thin-wall portions 214 have the same shape and the same minimum width. Alternatively, the thin-wall portions 214 may have different shapes.

Figure 10:
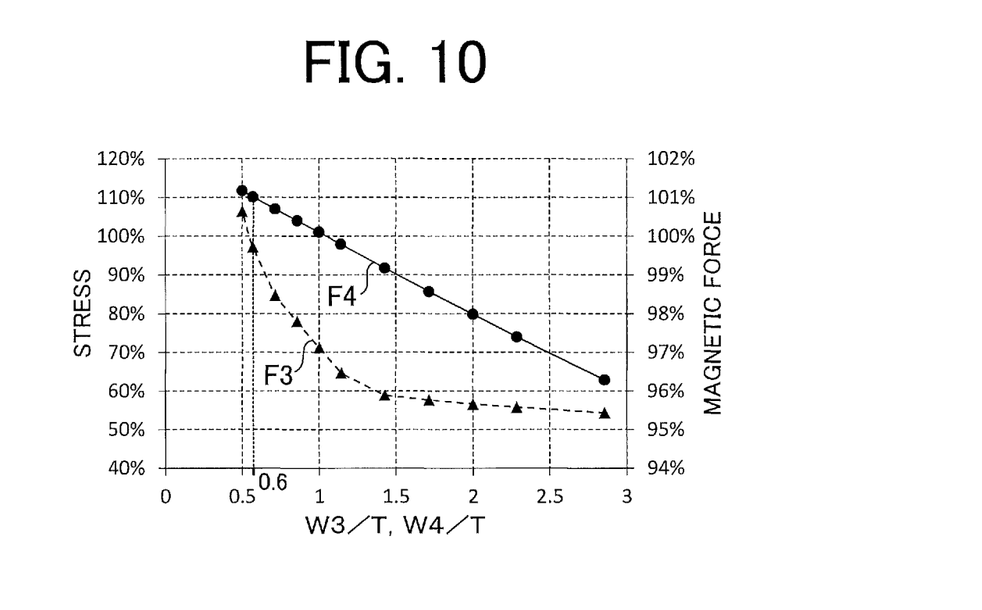
FIG. 10 is a graph showing a relationship between stress generated in a rotor core and a minimum width of the thin-wall portion.

FIG. 10 is a graph showing a relationship between stress generated in the rotor core 21 and the minimum widths W3 and W4 of the thin-wall portion 214. In FIG. 10, the first vertical axis represents a maximum stress generated in the rotor core 21 (specifically a ratio as compared to the comparative example), the second vertical axis represents a maximum magnetic force of the rotor 2 (specifically a ratio as compared to the comparative example), and the horizontal axis represents W3/T and W4/T. In this embodiment, W3 is equal to W4.

In FIG. 10, the broken line F3 represents a maximum stress generated in the rotor core 21 with respect to changes in the minimum width W3 and the minimum width W4 in a case where the maximum stress generated in the rotor core 21a of the rotor 2a of the comparative example is 100%. In FIG. 10, the solid line F4 represents a maximum magnetic force of the rotor 2 with respect to changes in the minimum widths W3 and W4 in the case where the magnetic force of the rotor 2a of the comparative example is 100%.

As shown in FIG. 10, a ratio W3/T of the minimum width W3 to the thickness T of the electromagnetic steel sheet 20 preferably satisfies 0.6≤W3/T≤1.5. In addition, a ratio W4/T of the minimum width W4 to the thickness of the electromagnetic steel sheet 20 preferably satisfies 0.6≤W4/T≤1.5. That is, the rotor 2 preferably satisfies 0.6≤W3/T≤1.5 and $0.6 \leq W4/T \leq 1.5$. Accordingly, stress generated in the rotor core 21, especially the thin-wall portions 214, can be reduced. In addition, since leakage flux in the thin-wall portions 214 is reduced, significant decrease of magnetic force of the rotor 2 can be suppressed. In this embodiment, since the rotor 2 satisfies $0.6 \leq W3/T \leq 1.5$ and $0.6 \leq W4/T \leq 1.5$, the advantages described above can be obtained.

In particular, if the rotor 2 satisfies $0.6 \leq W3/T \leq 1.0$ and $0.6 \leq W4/T \leq 1.0$, stress generated in the rotor core 21, especially the thin-wall portions 214, can be effectively reduced. In addition, since leakage flux in the thin-wall portions 214 is further reduced, a magnetic force of the rotor 2 can be enhanced.

Figure 11:
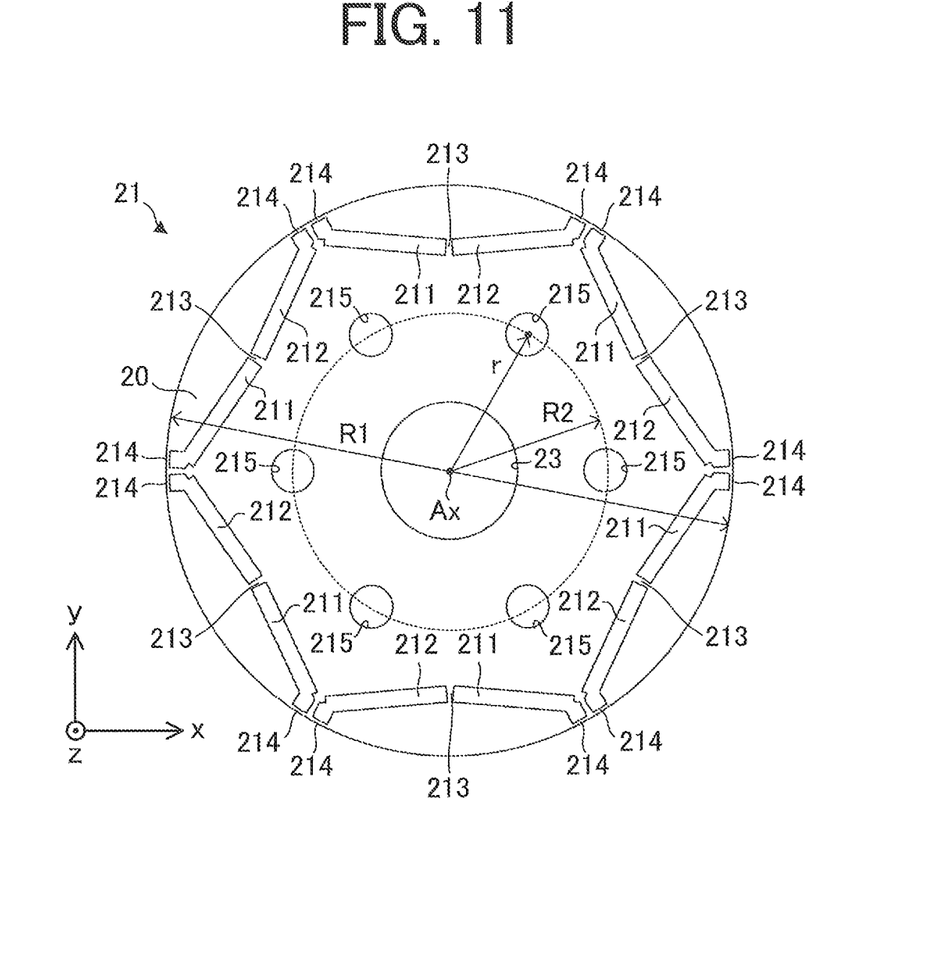
FIG. 11 is a diagram illustrating another example of the rotor core.

FIG. 11 is a diagram illustrating another example of the rotor core 21.

As illustrated in FIG. 11, the rotor core 21, specifically each electromagnetic steel sheet 20, may further include at least one hole 215. Each hole 215 extends in the axial direction. In the xy plane, each hole 215 is circular. For example, in the case of using the motor 1 as a driving source of the compressor, each hole 215 is used as a through hole through which a refrigerant passes in the compressor.

A relationship between a diameter φ and a distance r satisfies $φ/4 \leq r$, where φ is a diameter R1 of the electromagnetic steel sheet 20 (i.e., the rotor core 21) and r is a distance from the axis line Ax (i.e., rotation center of the rotor 2) to the center of the hole 215 in the xy plane. It is sufficient that the distance r from the axis line Ax to the center of at least one hole 215 of the plurality of holes 215 is φ/4 or more. That is, the distance r only needs to be a half or more of the radius of the electromagnetic steel sheet 20 (i.e., the rotor core 21). Accordingly, at least one hole 215 can be placed near the permanent magnets 22, and thus, the permanent magnets 22 can be effectively cooled, and demagnetization of the permanent magnets 22 can be suppressed.

In the example illustrated in FIG. 11, with respect to all the hole 215, the distance r from the axis line Ax to the center of each hole 215 is φ/4 or more. In FIG. 11, a radius R2 of a circle indicated by the broken line is φ/4. That is, in FIG. 11, the center of all the holes 215 is located outside a circle having the radius R2 indicated by the broken line. Accordingly, the permanent magnets 22 can be more effectively cooled, and demagnetization of the permanent magnets 22 can be suppressed.

Advantages of the rotor 2 will be described.

In the rotor 2, since the center rib 213 is formed on the rotor core 21, a part of stress generated in the rotor 2 is dispersed to the center rib 213, and thus stress generated in the thin-wall portions 214 can be reduced. Accordingly, deformation of the rotor core 21, especially the thin-wall portions 214, can be prevented. That is, strength of the rotor 2 to the centrifugal force can be enhanced, and leakage flux in the rotor 2 (especially the thin-wall portions 214) can be reduced.

In addition, in this embodiment, the rotor 2 satisfies $T \leq W1 \leq 2 \times T$. Accordingly, the first magnet insertion hole 211, the second magnet insertion hole 212, and the center rib 213 can be easily formed by punching, and leakage flux in the center rib 213 can be reduced.

In addition, the rotor 2 satisfies $2 \times T \leq W2$. Accordingly, strength does not decrease in a region 213a of the center rib 213. As a result, strength of the rotor 2 (especially the rotor core 21) can be increased.

That is, since the rotor 2 satisfies $T \leq W1 \leq 2 \times T \leq W2$, strength of the rotor 2 to the centrifugal force can be enhanced, and leakage flux in the rotor 2 can be reduced. As a result, a magnetic force of the rotor 2 can be enhanced, and motor efficiency can be increased.

If the rotor 2 satisfies $W1<W2$ and $0.9 \leq W1/T \leq 1.9$, stress generated in the rotor core 21, especially the center rib 213 and the thin-wall portions 214, can be reduced. In addition, since leakage flux in the center rib 213 can be reduced, a magnetic force of the rotor 2 can be enhanced. As a result, motor efficiency can be further increased.

In particular, since the rotor 2 satisfies $W1<W2$ and $0.9 \leq W1/T \leq 1.5$, stress applied to the rotor core 21, especially the center rib 213 and the thin-wall portions 214 can be reduced, and a magnetic force of the rotor 2 can be increased. As a result, motor efficiency can be further increased.

If the rotor 2 satisfies $0.6 \leq W3/T \leq 1.5$ and $0.6 \leq W4/T \leq 1.5$, stress generated in the rotor core 21, especially the thin-wall portions 214, can be reduced. In addition, since leakage flux in the thin-wall portions 214 is reduced, significant decrease of a magnetic force of the rotor 2 can be suppressed.

In particular, if the rotor 2 satisfies $0.6 \leq W3/T \leq 1.0$ and $0.6 \leq W4/T \leq 1.0$, stress generated in the rotor core 21, especially the thin-wall portions 214, can be effectively reduced. In addition, since leakage flux in the thin-wall portions 214 is further reduced, a magnetic force of the rotor 2 can be enhanced. As a result, motor efficiency can be further increased.

In addition, each electromagnetic steel sheet 20 further includes at least one hole 215, and if the rotor 2 satisfies $φ/4 \leq r$, at least one hole 215 can be placed near the permanent magnets 22. Thus, the permanent magnets 22 can be effectively cooled, and demagnetization of the permanent magnets 22 can be suppressed.

Since the motor 1 according to the first embodiment includes the rotor 2, the motor 1 can obtain the same advantages as those of the rotor 2 described above.

Since the motor 1 according to the first embodiment includes the rotor 2, motor efficiency of the motor 1 can be increased.

In the case where the stator 3 includes at least one notch 37, a space is formed between a housing of the compressor and the notch 37, and this space is used as a channel through which a refrigerant passes. Accordingly, the motor 1 can be effectively cooled in the compressor.

In the case where the stator 3 includes at least one hole 36, the hole 36 is used as a channel through which a refrigerant passes in the compressor. Accordingly, the motor 1 can be effectively cooled in the compressor.

Second Embodiment

A compressor 6 according to a second embodiment of the present invention will be described.

Figure 12:
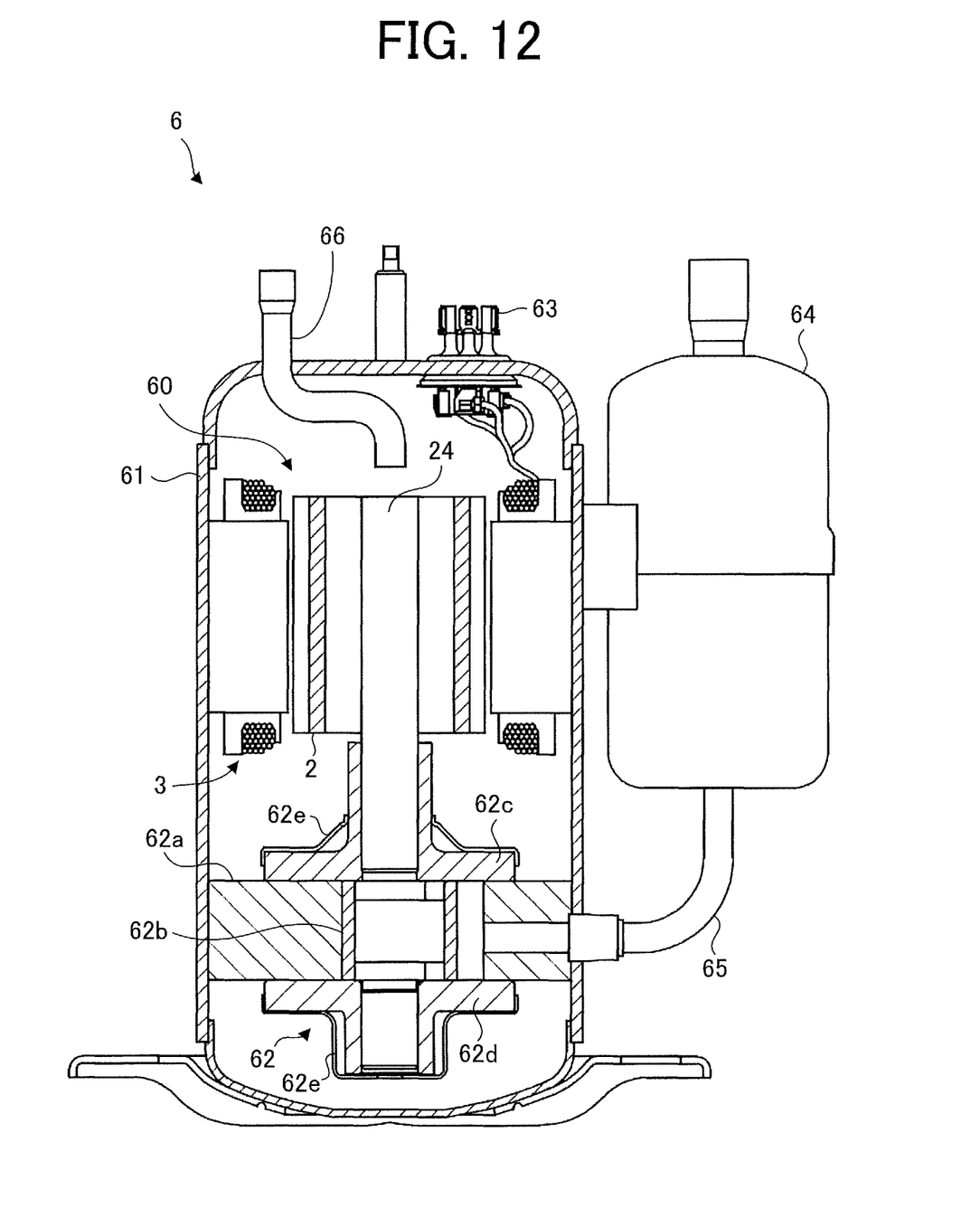
FIG. 12 is a cross-sectional view schematically illustrating a structure of a compressor according to a second embodiment of the present invention.

FIG. 12 is a cross-sectional view schematically illustrating a structure of the compressor 6 according to the second embodiment.

The compressor 6 includes a motor 60 serving as an electric element, a closed container 61 serving as a housing, and a compression mechanism 62 serving as a compression element. In this embodiment, the compressor 6 is a rotary compressor. However, the compressor 6 is not limited to the rotary compressor.

The motor 60 is the motor 1 according to the first embodiment. In this embodiment, the motor 60 is a permanent magnet-embedded motor, but is not limited to this type.

The closed container 61 covers the motor 60 and the compression mechanism 62. In a bottom portion of the closed container 61, refrigerating machine oil for lubricating a sliding portion of the compression mechanism 62 is stored.

The compressor 6 also includes a glass terminal 63 fixed to the closed container 61, an accumulator 64, a suction pipe 65, and a discharge pipe 66.

The compression mechanism 62 includes a cylinder 62a, a piston 62b, an upper frame 62c (first frame), a lower frame 62d (second frame), and a plurality of mufflers 62e individually attached to the upper frame 62c and the lower frame 62d. The compression mechanism 62 also includes a vane that divides the inside of the cylinder 62a into a suction side and a compression side. The compression mechanism 62 is driven by the motor 60.

The motor 60 is fixed in the closed container 61 by press fitting or shrink fitting. A stator 3 may be directly attached to the closed container 61 by welding, instead of press fitting or shrink fitting.

Electric power is supplied to a winding of the stator 3 of the motor 60 through the glass terminal 63.

A rotor (specifically one end of a shaft 24) of the motor 60 is rotatably supported by a bearing provided on each of the upper frame 62c and the lower frame 62d.

The shaft 24 is inserted in the piston 62b. The shaft 24 is rotatably inserted in the upper frame 62c and the lower frame 62d. The upper frame 62c and the lower frame 62d close an end face of the cylinder 62a. The accumulator 64 supplies a refrigerant (e.g., refrigerant gas) to the cylinder 62a through the suction pipe 65.

Next, an operation of the compressor 6 will be described. A refrigerant supplied from the accumulator 64 is sucked into the cylinder 62a from the suction pipe 65 fixed to the closed container 61. The motor 60 rotates by electrification of an inverter and consequently the piston 62b fitted to the shaft 24 rotates in the cylinder 62a. In this manner, the refrigerant is compressed in the cylinder 62a.

The Refrigerant passes through the mufflers 62e and rises in the closed container 61. Refrigerating machine oil is mixed in the compressed refrigerant. While the mixture of the refrigerant and the refrigerating machine oil is passing through a hole formed in a rotor core, separation between the refrigerant and the refrigerating machine oil is promoted, and accordingly, a flow of refrigerating machine oil into the discharge pipe 66 can be prevented. In this manner, the compressed refrigerant is supplied to a high-pressure side of a refrigerant cycle through the discharge pipe 66.

As a refrigerant of the compressor 6, R410A, R407C, or R22, for example, can be used. However, the refrigerant of the compressor 6 is not limited to these materials. For example, as a refrigerant of the compressor 6, a refrigerant having a small global warming potential (GWP) or the like may be used.

Typical examples of the refrigerant having small GWPs include refrigerants as follows:

(1) Halogenated hydrocarbon including a carbon double bond in a composition is, for example, HFO-1234yf (CF3CF=CH2). HFO stands for Hydro-Fluoro-Olefin. Olefin is unsaturated hydrocarbon having one double bond. The GWP of HFO-1234yf is 4.

(2) Hydrocarbon having a carbon double bond in a composition is, for example, R1270 (propylene). The GWP of the R1270 is 3, which is smaller than the GWP of HFO-1234yf, but flammability of R1270 is higher than flammability of HFO-1234yf.

(3) A mixture including at least one of halogenated hydrocarbon having a carbon double bond in a composition or hydrocarbon having a carbon double bond in a composition is, for example, a mixture of HFO-1234yf and R32.

Since HFO-1234yf is a low-pressure refrigerant, a pressure loss is large, and performance in a refrigeration cycle (especially in an evaporator) tends to degrade. Thus, it is preferable to use a mixture with R32 or R41, each of which is a high-pressure refrigerant, for example.

The compressor 6 according to the second embodiment has advantages described in the first embodiment.

In addition, the use of the motor 1 according to the first embodiment as the motor 60 can enhance efficiency of the motor 60, and as a result, efficiency of the compressor 6 can be enhanced.

Third Embodiment

An air conditioner 50 (also referred to as a refrigerating air conditioner or a refrigeration cycle device) according to a third embodiment of the present invention will be described.

Figure 13:
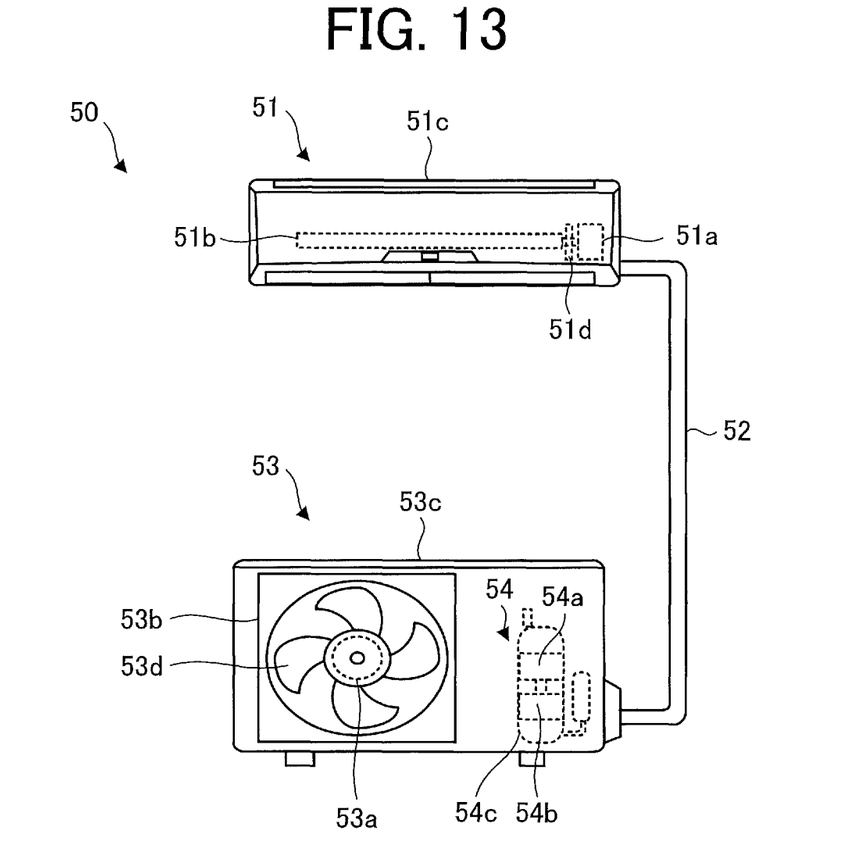
FIG. 13 is a diagram illustrating a configuration of an air conditioner according to a third embodiment of the present invention.

FIG. 13 is a diagram schematically illustrating a configuration of the air conditioner 50 according to the third embodiment.

The air conditioner 50 according to the third embodiment includes an indoor unit 51 serving as an air blower (first air blower), a refrigerant pipe 52, and an outdoor unit 53 serving as an air blower (second air blower) connected to the indoor unit 51 through the refrigerant pipe 52.

The indoor unit 51 includes a motor 51a (e.g., the motor 1 according to the first embodiment), an air blow unit 51b that is driven by the motor 51a to thereby send air, and a housing 51c covering the motor 51a and the air blow unit 51b. The air blow unit 51b includes a blade 51d that is driven by the motor 51a, for example. For example, the blade 51d is fixed to a shaft (e.g., a shaft 24) of the motor 51a, and generates an airflow.

The outdoor unit 53 includes a motor 53a (e.g., the motor 1 according to the first embodiment), an air blow unit 53b, a compressor 54, and a heat exchanger (not shown). The air blow unit 53b is driven by the motor 53a to thereby send air. The air blow unit 53b includes a blade 53d that is driven by the motor 53a, for example. For example, the blade 53d is fixed to a shaft (e.g., a shaft 24) of the motor 53a, and generates an airflow. The compressor 54 includes a motor 54a (e.g., the motor 1 according to the first embodiment), a compression mechanism 54b (e.g., a refrigerant circuit) that is driven by the motor 54a, and a housing 54c covering the motor 54a and the compression mechanism 54b. The compressor 54 is, for example, the compressor 6 described in the second embodiment.

In the air conditioner 50, at least one of the indoor unit 51 or the outdoor unit 53 includes the motor 1 described in the first embodiment. Specifically, as a driving source of the air blow unit, the motor 1 described in the first embodiment is applied to at least one of the motors 51a or 53a. As the motor 54a of the compressor 54, the motor 1 described in the first embodiment may be used.

The air conditioner 50 can perform operations such as a cooling operation of sending cold air from the indoor unit 51 or a heating operation of sending hot air from the indoor unit 51, for example. In the indoor unit 51, the motor 51a is a driving source for driving the air blow unit 51b. The air blow unit 51b can send conditioned air.

In the air conditioner 50 according to the third embodiment, since the motor 1 described in the first embodiment is applied to at least one of the motors 51a or 53a, the same advantages as those described in the first embodiment can be obtained. Accordingly, efficiency of the air conditioner 50 can be enhanced.

In addition, as a driving source of an air blower (e.g., the indoor unit 51), the motor 1 according to the first embodiment is used. Thus, the same advantages as those described in the first embodiment can be obtained. In this manner, efficiency of the air blower can be enhanced. An air blower including the motor 1 according to the first embodiment and the blade (e.g., the blade 51d or 53d) driven by the motor 1 can be used singly as a device for sending air. This air blower is also applicable to devices other than the air conditioner 50.

The use of the motor 1 according to the first embodiment as a driving source of the compressor 54 can obtain the same advantages as those described in the first embodiment. Accordingly, efficiency of the compressor 54 can be enhanced.

The motor 1 described in the first embodiment can be mounted on equipment including a driving source, such as a ventilator, household electrical appliance, or a machine tool, other than the air conditioner 50.

Features of the embodiments described above may be combined as appropriate.

What is claimed is:

1. A rotor comprising:
   an electromagnetic steel sheet including a first magnet insertion hole, a second magnet insertion hole, and a center rib between the first magnet insertion hole and the second magnet insertion hole, the first magnet insertion hole and the second magnet insertion hole being arranged in a V shape in a plane orthogonal to an axial direction;
   a first permanent magnet disposed in the first magnet insertion hole; and
   a second permanent magnet disposed in the second magnet insertion hole, wherein
   the rotor satisfies $T \leq W1 \leq 2 \times T \leq W2$, $W1 < W2$, and $0.9 \leq W1/T \leq 1.9$,
   where T is a thickness of the electromagnetic steel sheet, W1 is a minimum width of the center rib in a direction orthogonal to a radial direction, and W2 is a maximum width of the center rib in the direction orthogonal to the radial direction, wherein
   a location having the minimum width W1 is a radially outer end of the center rib.

2. The rotor according to claim 1, wherein the rotor satisfies $W1 < W2$ and $0.9 \leq W1/T \leq 1.5$.

3. The rotor according to claim 1, wherein
   the electromagnetic steel sheet includes a first thin-wall portion between an outer peripheral surface of the electromagnetic steel sheet and the first magnet insertion hole,
   the electromagnetic steel sheet includes a second thin-wall portion between the outer peripheral surface of the electromagnetic steel sheet and the second magnet insertion hole,
   the first magnet insertion hole includes a first flux barrier that is a space between the first permanent magnet and the first thin-wall portion,
   the second magnet insertion hole includes a second flux barrier that is a space between the second permanent magnet and the second thin-wall portion, and
   the rotor satisfies $0.6 \leq W3/T \leq 1.5$ and $0.6 \leq W4/T \leq 1.5$, where in the plane, W3 is a minimum width of the first thin-wall portion in a first radial direction and W4 is a minimum width of the second thin-wall portion in a second radial direction.

4. The rotor according to claim 3, wherein the rotor satisfies $0.6 \leq W3/T \leq 1.0$ and $0.6 \leq W4/T \leq 1.0$.

5. The rotor according to claim 1, wherein
   the electromagnetic steel sheet includes a hole extending in the axial direction, and
   the rotor satisfies $\varphi/4 \leq r$,
   where $\varphi$ is a diameter of the electromagnetic steel sheet and r is a distance from a rotation center of the rotor to a center of the hole in the plane.

6. A motor comprising:
   a stator; and
   the rotor according to claim 1 disposed inside the stator.

7. The motor according to claim 6, wherein the stator includes at least one notch formed on an outer peripheral surface of the stator.

8. The motor according to claim 6,
   wherein the stator includes at least one hole extending in the axial direction.

9. A compressor comprising:
   the motor according to claim 6;
   a compression mechanism to be driven by the motor; and
   a housing covering the motor and the compression mechanism.

10. A refrigeration and air-conditioning device comprising:
    an indoor unit; and
    an outdoor unit connected to the indoor unit, wherein
    at least one of the indoor unit or the outdoor unit includes the motor according to claim 6.

* * * * *